(12) United States Patent
Falsafi

(10) Patent No.: US 10,608,755 B2
(45) Date of Patent: Mar. 31, 2020

(54) METHOD AND APPARATUS FOR WIRELESS COMMUNICATION WITH IMPROVED PERFORMANCE

(71) Applicant: Aram Falsafi, Seattle, WA (US)

(72) Inventor: Aram Falsafi, Seattle, WA (US)

(73) Assignee: Aram Falsafi, Seattle, WA (US)

( * ) Notice: Subject to any disclaimer, the term of this patent is extended or adjusted under 35 U.S.C. 154(b) by 28 days.

(21) Appl. No.: 15/360,949

(22) Filed: Nov. 23, 2016

(65) Prior Publication Data

US 2018/0145772 A1    May 24, 2018

(51) Int. Cl.
| | |
|---|---|
| *H04B 15/00* | (2006.01) |
| *H04W 84/12* | (2009.01) |
| *H04W 24/02* | (2009.01) |
| *H04W 16/28* | (2009.01) |
| *H04W 48/06* | (2009.01) |
| *H04W 24/10* | (2009.01) |
| *H04W 16/14* | (2009.01) |

(52) U.S. Cl.
CPC ............ *H04B 15/00* (2013.01); *H04W 16/28* (2013.01); *H04W 24/02* (2013.01); *H04W 24/10* (2013.01); *H04W 48/06* (2013.01); *H04W 84/12* (2013.01); *H04W 16/14* (2013.01)

(58) Field of Classification Search
CPC ...... H04B 15/00; H04W 24/10; H04W 45/16; H04W 48/12; H04W 16/18; H04W 16/14; H04W 72/02; H04W 4/10; H04W 12/0453; H04W 24/02; H04W 16/28; H04W 48/06; H04W 84/12

USPC ... 455/63.1, 446, 447, 448, 455, 422.1, 516, 455/62
See application file for complete search history.

(56) References Cited

U.S. PATENT DOCUMENTS

| | | | |
|---|---|---|---|
| 8,792,414 B2 | 7/2014 | Kish | |
| 8,977,274 B2 * | 3/2015 | Sadek | H04W 16/14 455/448 |
| 9,036,563 B2 | 5/2015 | Wang | |
| 2004/0146013 A1 * | 7/2004 | Song | H04B 7/15507 370/279 |
| 2004/0203815 A1 * | 10/2004 | Shoemake | H04W 72/02 455/450 |

(Continued)

FOREIGN PATENT DOCUMENTS

EP    2 739 106 A2    6/2014

*Primary Examiner* — Raymond S Dean

(57) ABSTRACT

System and method are described for reducing the amount and the duration of radio frequency interference that a wireless communication system operating in an unlicensed frequency band receives from nearby devices, by ensuring that neighboring wireless systems are aware of the existence of any wireless system implementing the present disclosure, as well as the frequency bands that are occupied by said wireless system. This is accomplished by placing processor equipped radio transceivers (denominated secondary transceivers) in the periphery of the primary geographic region covered by the wireless communication system incorporating this disclosure, directing the radio signals of said secondary transceivers towards region or regions surrounding said primary geographic coverage region, and using the processors to coordinate the transmission of signals from said secondary transceivers.

20 Claims, 4 Drawing Sheets

(56) References Cited

U.S. PATENT DOCUMENTS

| | | | |
|---|---|---|---|
| 2012/0120887 A1* | 5/2012 | Deaton | H04W 16/14 370/329 |
| 2013/0343315 A1* | 12/2013 | Tiirola | H04W 72/1231 370/329 |
| 2014/0010086 A1* | 1/2014 | Etemad | H04W 4/70 370/235 |
| 2014/0295863 A1* | 10/2014 | Oyama | H04W 16/14 455/450 |
| 2015/0092703 A1* | 4/2015 | Xu | H04L 5/003 370/329 |
| 2015/0245411 A1* | 8/2015 | Damnjanovic | H04W 16/14 370/328 |
| 2016/0021679 A1* | 1/2016 | Jose | H04W 72/1278 370/329 |
| 2016/0233989 A1* | 8/2016 | Belghoul | H04L 1/1887 |
| 2016/0316422 A1* | 10/2016 | Regan | H04W 48/16 |
| 2017/0311316 A1* | 10/2017 | Chendamarai Kannan | H04W 48/16 |

* cited by examiner

METHOD AND APPARATUS FOR WIRELESS COMMUNICATION WITH IMPROVED PERFORMANCE

BACKGROUND

Technical Field of the Disclosure

The present disclosure is in the technical field of wireless data networking. More particularly, the present disclosure relates to the reduction of radio frequency interference in a given set of one or more wireless channels, typically in unlicensed frequency bands.

Description of the Related Art

A serious limitation of wireless communication in an unlicensed frequency band is that users do not have exclusive rights to the use of the radio frequency bands that they depend on for wireless communication. Therefore, there always exists the risk of radio frequency interference from nearby devices that are owned and operated by other users.

Traditionally, most unlicensed radio frequency bands have been used primarily for wireless local area networking, where fixed equipment compliant with variants of the IEEE 802.11 standard (for example IEEE 802.11-2012) is deployed, said equipment using radio signals in certain unlicensed frequency bands to communicate with end user equipment, giving the end users access to a local area network, and optionally, to a wide area network and the public Internet.

More recently, service providers that had traditionally offered data services over fixed telephone lines, cable TV connections, and licensed mobile frequencies have started to offer wireless data service using the same unlicensed radio frequency bands that had traditionally been used by wireless local area networks. This increase in usage has led to concerns about availability of interference-free frequency channels for use by wireless local area networks.

Currently, one of the more popular frequency bands for unlicensed communication is the so-called 2.4 GHz unlicensed band, due to its larger coverage area compared to higher-frequency bands that are also available for unlicensed communications. One drawback of the 2.4 GHZ unlicensed band is that even though multiple channels exist in this band, each channel overlaps with many of its neighboring channels, because the center frequencies of neighboring channels are too close to each other.

In the current state of the art, most unlicensed-band wireless standards already require a transmitter to perform a clear channel assessment before starting its transmission, in order to ensure that no other compatible transmitter is using the same channel at that moment in time. Furthermore, in the current state of the art, most wireless communication systems perform dynamic channel assignment, whereby the radio transceivers, operating under the control of a local or central processor, attempt to detect the presence of other radio transmitters in the channel or channels that they have chosen to use, and in the event of excessive radio interference, said wireless communication systems switch some or all of their radio transceivers to a different radio frequency channel.

In the current state of the art, many inventions address sharing of radio frequency spectrum between incompatible radio access technologies (RATs), for example the sharing of an unlicensed band by a wireless local area network compliant with the IEEE 802.11-2012 standard and a cellular network compliant with the Long Term Evolution (LTE) standard, where both networks operate in the same unlicensed band. These include techniques for communicating between the different RATs in order to minimize interference, as well as techniques for cancelling interference from one RAT within a receiver operating according to a different RAT.

Other inventions use mobile devices to report on the level of interference that is present in the general vicinity of each mobile device, and have the network elements use this information to aid in selection of radio channel and help determine when to transmit packets. However, any method that depends on mobile devices for detecting, reporting, or mitigating interference will be limited due to its dependence on the presence of mobile devices in different parts of the coverage area, the feature sets that said mobile devices support, and the geographic coverage of each mobile device, the latter being a function of the device's battery-powered radio transmitter.

Previous work in this field includes:

Sangki Yun and Lili Qiu, "Supporting WiFi and LTE Co-existence", IEEE INFOCOM 2015

"LTE in Unlicensed Spectrum: Harmonious Coexistence with Wi-Fi," June 2014, Qualcomm research paper available from: http://www.qualcomm.com/media/documents/files/lte-unlicensed-coexistence-whitepaper.pdf IEEE Std 802.11-2012, "Part 11: Wireless LAN Medium Access Control (MAC) and Physical Layer (PHY) Specifications," 20 Mar. 2012, available from Institute of Electrical and Electronic Engineers at: http://standards.ieee.org/getieee802/download/802.11-2012.pdf "Spectrum sharing in the unlicensed band," U.S. Pat. No. 7,363,008

"Unlicensed band heterogeneous network coexistence algorithm," US Patent Publication 20070097891

"Collision Avoidance Scheme for Wireless Communications over Unlicensed Spectrum," US Patent Publication 20140341135

"Techniques for Performing Carrier Sense Adaptive Transmission in Unlicensed Spectrum," US Patent Publication 20150085683

"Coordinating radio resource usage in unlicensed frequency bands," US Patent Publication 20060148482

"Interface for Interference Mitigation in Unlicensed Frequency Bands", US Patent Publication 20160066306

"Clear-To-Send Signaling to Limit Wifi Interference in Unlicensed Spectrum", US Patent Application 20160021679

"Network Assisted Interference Mitigation", US Patent Publication 20160262161

"Mitigation of Interference Between Co-Located Radio Access Technologies", US Patent Publication 20160330756

BRIEF SUMMARY OF THE EMBODIMENTS

The present disclosure is a wireless communication system that limits the amount and the duration of radio frequency interference from nearby devices through the strategic placement and custom configuration of certain radio network elements.

In this disclosure, the term "radio network element" is used in a generic sense to refer to any device that is under the administrative control of the network administrator, and that contains one or more radio transceivers, that is capable of communicating with mobile devices and with other devices over one or more radio antennas, independent of the radio access technology. As such, a UMTS Node-B, an LTE enhanced Node-B, a WIFI access point, or a WIFI Wireless Termination Point can all be considered radio network elements for the purpose of this disclosure. Typically all radio transceivers discussed in this specification are under the control of at least one processor.

A wireless system incorporating this disclosure takes advantage of the existing processor-controlled clear channel assessment and processor-controlled dynamic channel allocation algorithms described earlier in this document, by increasing the likelihood that devices belonging to neighboring wireless systems are aware of said wireless system's channels and said wireless system's periods of transmission and reception. This will increase the likelihood that neighboring wireless communication devices will either choose a different radio frequency channel, or refrain from using the shared radio channel while the system incorporating this disclosure is transmitting or receiving a wireless signal.

The present disclosure can be implemented as multiple radio network elements, each radio network element having its own processor or processors, its own transceiver or transceivers, and its own antenna or antennas, where the radio network elements are coordinating their transmissions. Alternatively, the disclosure can be implemented as one radio network element with one or more processors, one or more transceivers and multiple antennas, with the different antennas placed in different locations. The latter implementation represents a simpler and more cost-effective design.

DETAILED DESCRIPTION

Reference will now be made in detail to one or more embodiments of the present disclosure. While the disclosure will be described with respect to these embodiments, it should be understood that the disclosure is not limited to any particular embodiment. On the contrary, the present disclosure includes alternatives, modifications, and equivalents as may come within the spirit and scope of the appended claims. Furthermore, in the following description, numerous specific details are set forth to provide a thorough understanding of the present disclosure. The present disclosure may be practiced without some or all of these specific details. In other instances, well-known structures and principles of operation have not been described in detail, so as to avoid obscuring the disclosure.

Unless otherwise defined, all terms used herein have the same meaning as commonly understood by one of ordinary skills in the art to which the exemplary embodiment(s) belongs.

Figure 1:
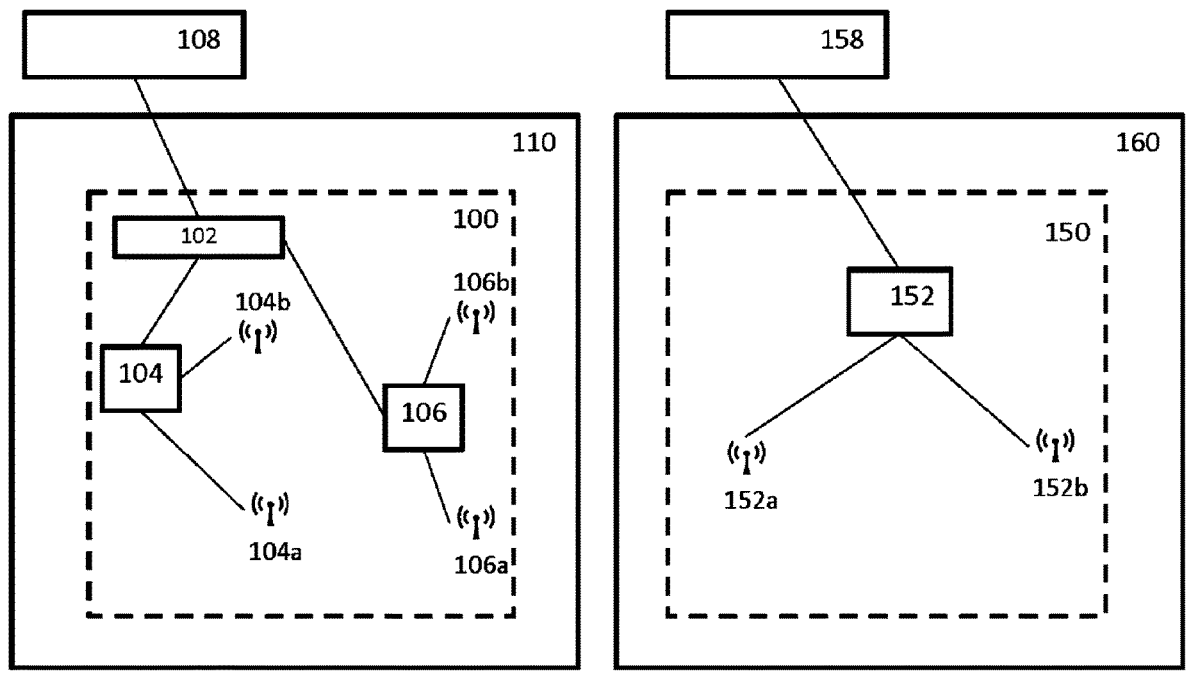
FIG. 1 shows a system diagram describing an embodiment of the present disclosure in relation to another wireless system operating in close proximity to said embodiment.

Referring to the present disclosure, FIG. 1 shows a general block diagram of an embodiment of the disclosure comprising a wireless communication system 100, said wireless communication system 100 comprising a wireless network controller 102, a plurality of radio network elements 104, 106, and a plurality of radio antennas 104a, 104b, 106a, 106b. Each radio network element 104, 106 is connected via one or more cables to the network controller 102. Each antenna 104a, 104b, 106a, 106b is connected via a cable to one of the radio network elements 104, 106. The wireless communication system 100 is connected via one or more cables to a data communication network 108. The wireless communication system 100 provides wireless communication services to users in a geographic coverage area 110.

FIG. 1 also shows a neighboring wireless data communication system 150, said neighboring wireless data communication system 150 comprising a radio network element 152 and one or more radio antennas 152a, 152b. The neighboring radio communication system 150 is connected to a data communication network 158 and provides wireless communication signals to users in a geographic area 160, which is close to geographic area 110. Typically, wireless data communication systems 100 and 150 are under the administrative control of different organizational entities, for example different companies.

Referring again to FIG. 1, neighboring wireless communication device 152 may be a device compatible with the IEEE 802.11-2012 standard such as a wireless local area router or wireless access point. Alternatively, neighboring wireless communication device 152 may be an LTE base station deployed by a mobile cellular operator and operating in the same unlicensed band as communication system 100. Furthermore, while FIG. 1 shows the intended coverage areas 110 and 160 as non-overlapping, it is possible that the two coverage areas may overlap, for example in the case where neighboring coverage area 160 corresponds to an LTE cell from a mobile operator, where said mobile cell is intended to include the building in which system 100 is deployed.

In the current state of the art, all antennas of wireless communication system 100 are placed in a manner so as to provide optimal signal strength and radio coverage to users in geographic area 110, while at the same time trying to minimize the system's signal strength outside of geographic area 110, including within neighboring region 160.

According to one embodiment of the present disclosure, the antennas of radio network element 104 (denominated primary network element in this disclosure) will transmit signals to mobile devices in geographic area 110, for the purpose of providing wireless communication services to fixed and mobile devices in said geographic area 110. On the other hand, the antennas of radio network element 106 (denominated secondary network element in this disclosure) will transmit signals specifically to ensure that neighboring system 150 is aware of the presence of wireless communication system 100, and to further ensure that neighboring wireless communication system 150 is aware of the frequency channels in use by communication system 100, as well as the time periods in which wireless communication system 100 is transmitting or receiving a wireless signal.

Referring again to FIG. 1, according to one embodiment of this disclosure, the wireless network controller 102 will coordinate assignment of the frequency channels to radio network elements 104, 106 based on channel utilization reports that it receives from radio network elements 104, 106 as well as channel utilization repots that it receives over one or more wireless channels from mobile devices connected to radio network element 104 over said wireless channel or channels. Wireless network controller 102 will also synchronize the transmission of radio frequency signals by radio network elements 104, 106.

Referring again to FIG. 1, in another embodiment of this disclosure, the radio network elements 104, 106 are wireless access points as defined in the IEEE 802.11-2012 standard and operating in the 2.4 GHz unlicensed band, and the secondary radio network element 106 transmits signals on one or more channels that are different than the channel used by primary radio network element 104, but whose radio frequency channel overlaps with the radio frequency channel used by radio network element 104. For example, the signal from antennas 104a and 104b may be on 2.4 GHz channels 1 and 6, while the signal from antennas 106a and 106b may be on channels 2, 3, 4, 5, 7, 8, or a combination thereof. In this embodiment, the choice of radio frequency channels used by radio network element 106 will be based on the channels in use by neighboring wireless systems, including radio network element 152.

Referring again to FIG. 1, in another embodiment of this disclosure, the primary radio network element 104 is a wireless access point as defined in the IEEE 802.11-2012 standard and operating in the 2.4 GHz unlicensed band, while the secondary radio network element 106 operates according to a different radio access technology, for example Long Term Evolution (LTE).

Figure 2:
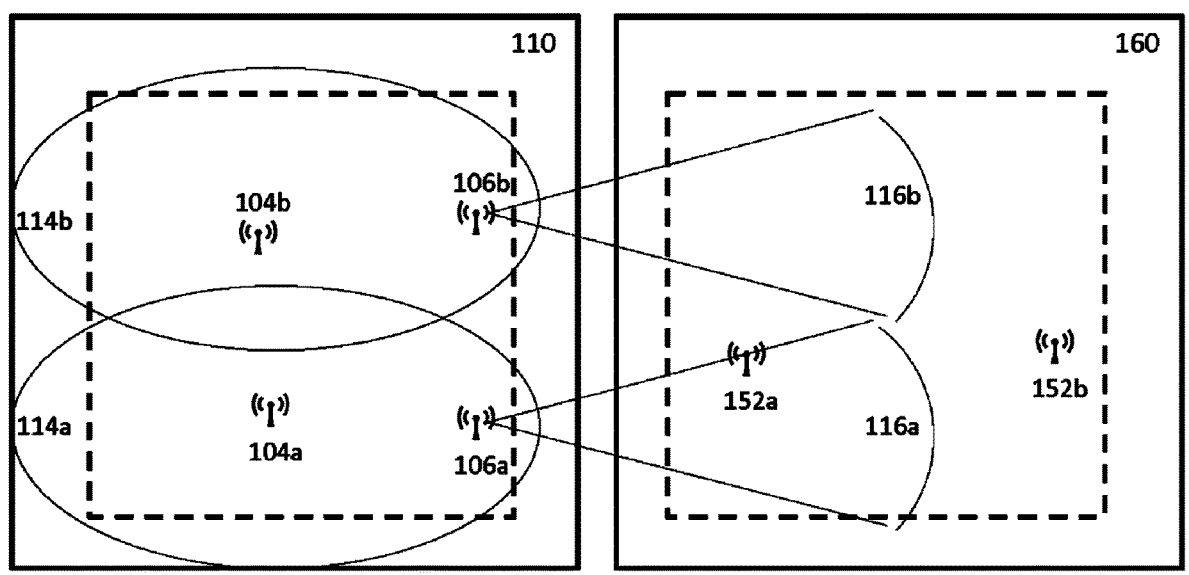
FIG. 2 shows a detailed diagram describing sample coverage areas of the different antennas of the system detailed previously in FIG. 1.

Referring now to the disclosure, FIG. 2 shows a portion of the elements described in FIG. 1, specifically the radio antennas of system 100 and their coverage areas. The coverage area of antennas 104a and 104b (pertaining to primary radio network element 104 described earlier) are shown as oval regions 114a and 114b respectively, and cover most of the geographic area 110. On the other hand, the coverage area of antennas 106a and 106b (pertaining to secondary radio network element 106 described earlier) are shown as regions 116a and 116b, and extend primarily into neighboring geographic area 160. The directional coverage areas of antennas 106a and 106b can be obtained using directional antennas, for example patch antennas. It must be noted that in the interest of simplicity, FIG. 2 does not demonstrate all of the elements of the wireless system 100 and neighboring wireless system 150, although it is understood that all of the elements of systems 100 and 150, as depicted in FIG. 1, would also be present in the system depicted in FIG. 2.

Figure 3:
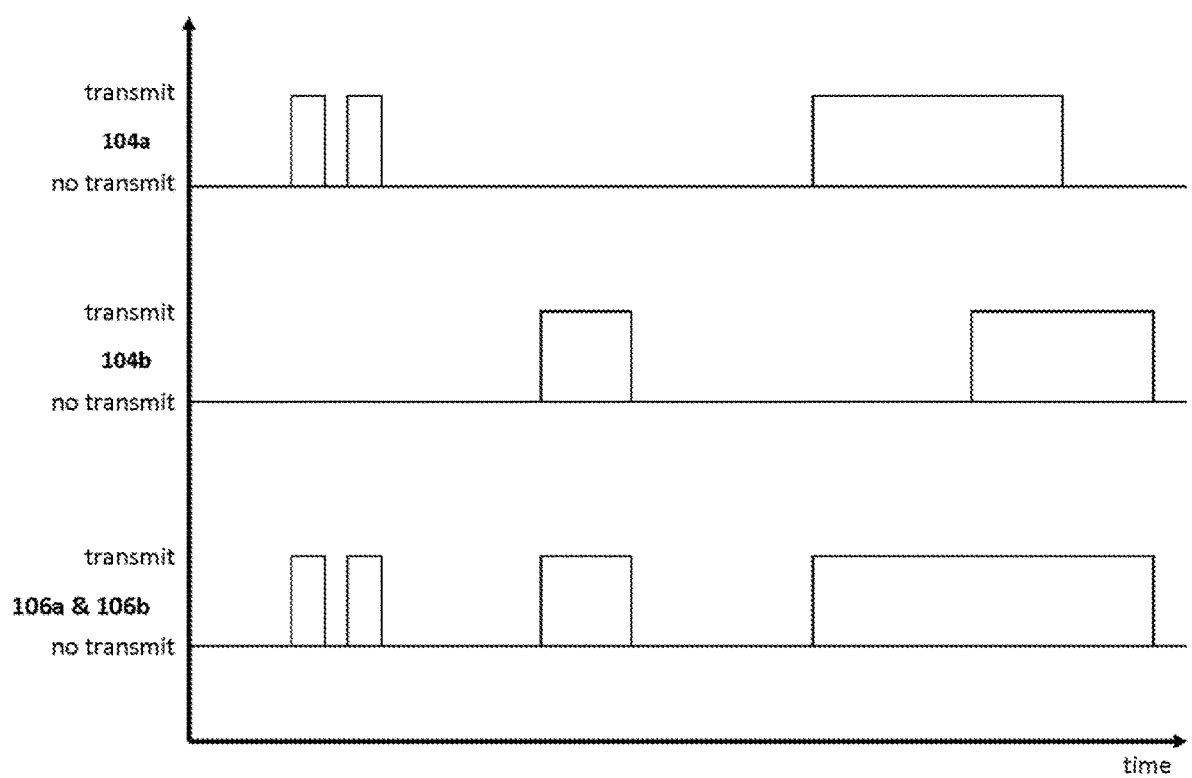
FIG. 3 shows a sample timeline of possible on/off periods for radio transmitters connected to the primary antennas 104a, 104b, and secondary antennas 106a, 106b detailed previously in FIG. 1.

Referring again to the disclosure, FIG. 3 shows a timeline describing possible periods of transmission and non-transmission for the radio transmitters connected to each of the four antennas 104a, 104b, 106a, and 106b, described previously. In the timing diagram of FIG. 3, which represents only one possible implementation among many, the secondary radio network element connected to antennas 106a and 106b transmits a signal out of both antennas 106a and 106b whenever a signal is being transmitted from either antenna of primary radio network element 104.

Referring again to FIG. 3, when the secondary radio network element 106 is not transmitting a signal it can be using its antennas 106a and 106b to scan unlicensed band channels, in order to detect sources of interference, and report details about said sources of interference to wireless controller 102.

Figure 4:
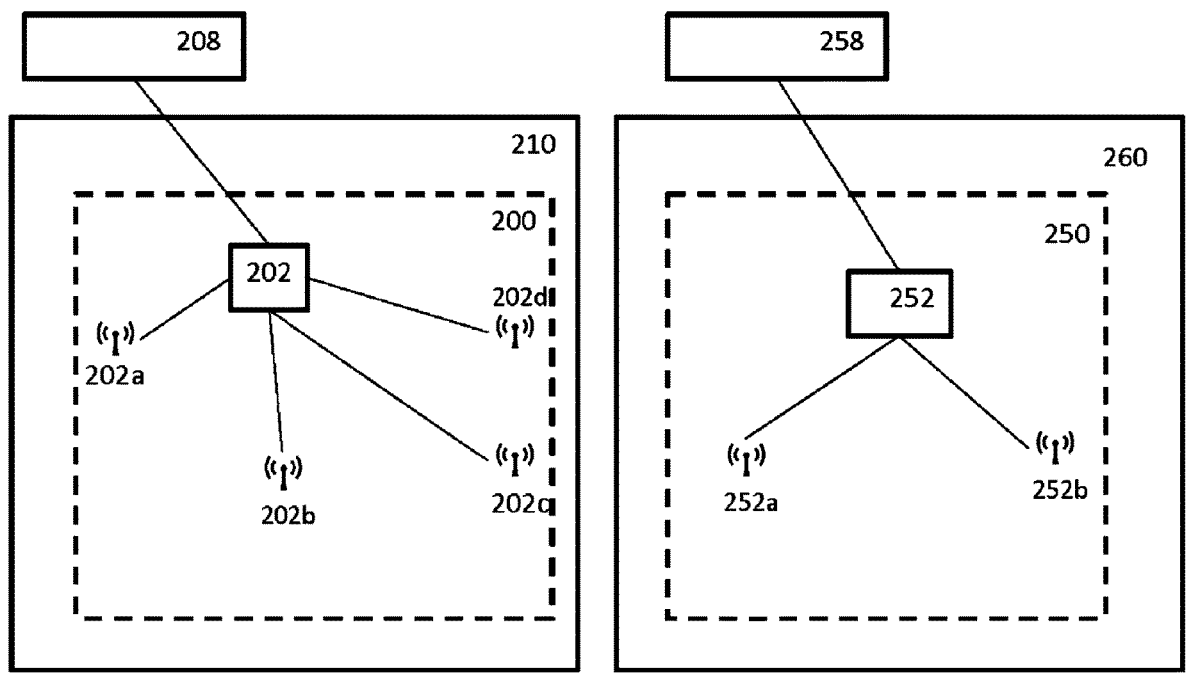
FIG. 4 shows a system diagram describing a simpler embodiment of the present disclosure.

Referring again to the disclosure, FIG. 4 shows an alternative, simplified implementation of the disclosure, comprising a wireless communication system 200, said wireless communication system 200 comprising a wireless communication device 202 and a plurality of antennas 202a, 202b, 202c, 202d. Each antenna 202a, 202b, 202c, 202d is connected via a cable to the wireless communication device 202. The wireless communication system 200 is also connected via one or more cables to a data communication network 208. The wireless communication system 200 provides wireless communication services to users in a geographic area 210.

FIG. 4 also shows a neighboring wireless data communication system 250, said neighboring wireless data communication system 250 comprising a wireless communication device 252 and one or more radio antennas 252a, 252b. The neighboring radio communication system 250 is also connected to a data communication network 258 and provides wireless communication signals to users in a geographic area 260, which is close to the geographic area 210.

Referring again to FIG. 4, in one embodiment of this disclosure, a subset of the antennas 202a, 202b are placed in locations that ensure optimal signal strength and radio coverage within geographic area 210, while another subset of the antennas 202c, 202d are placed in locations that ensure maximum signal penetration into neighboring geographic area 260. The radio signals transmitted from antennas 202a, 202b are intended to carry data packets to wireless devices within geographic area 210. On the other hand, the radio signals transmitted from antennas 202c, 202d are intended to notify neighboring wireless system 250 that wireless system 200 is transmitting or receiving data on a particular channel for a given time period.

It must be noted that each of the cables described in the accompanying FIGS. 1, 2, and 4 may be comprised of optical fiber, copper, or any other physical medium that is capable of transmitting a communication signal. In an alternative embodiment of this disclosure, one or more of the cables described in the accompanying figures may be replaced with a wireless signal.

The sample embodiment described in FIG. 1 shows the antennas 106a and 106b of the secondary radio network element 106 as being located inside the primary coverage area 110, and the sample embodiment described in FIG. 4 shows the secondary antennas 204c and 204d as being located inside the primary coverage area 210. However, it must be noted that there is no reason why said secondary antennas cannot be place outside of their respective primary coverage areas. For example, if the goal of a certain deployment is to minimize interference from an LTE transceiver that is installed outdoors, the secondary antennas 106a, 106b could be placed on the outside of the building that contains the said primary coverage area 110.

One advantage offered by the current disclosure, without limitation, is that it reduces the probability that neighboring systems will use the same frequency channel or channels that are in use by any wireless system incorporating this disclosure, or any frequency channel that may overlap with the frequency channel or channels that are in use by any wireless system incorporating this disclosure.

Another advantage offered by the current disclosure, without limitation, is that in the event that another nearby wireless system is using the same unlicensed channel or channels as used by a wireless system incorporating this disclosure, the probability that both wireless systems will be transmitting or receiving data at the same time will be reduced.

Another advantage offered by the current disclosure, without limitation, is that it does not depend on the presence of, or the features implemented in, users' mobile devices.

In broad embodiment, the present disclosure is a wireless communication system that, in addition to maximizing communication with its users, is also capable of reducing the amount of interference received from neighboring wireless communication systems.

It should be noted that the underlying concept of the exemplary embodiments of the present disclosure would not change if one or more blocks (or devices) were added to or removed from the diagrams in FIG. 1, FIG. 2, or FIG. 4.

The following paragraph describes one exemplary method, among many, for implementing the present disclosure.

The present disclosure can be implemented by first installing one or more radio transceivers (hereby denominated primary transceivers) in a primary geographic region in which wireless communication is to be offered to fixed and mobile devices. These primary transceivers will be controlled by one or more processors and will provide wireless communication services in said geographic region. Furthermore, a second set of transceivers (denominated secondary transceivers) will be placed, either on the periphery of the primary geographic region, in its vicinity, or in a combination of the two. These secondary transceivers will be connected to the same wired network as the primary transceivers and will also be controlled by one or more processors. Furthermore, the secondary transceivers will be installed and configured such that the signals emanating from their antennas are directed not toward the primary geographic region, but towards the surrounding areas where neighboring wireless networks may be operational. A central controller comprising a processor and one or more communication links will communicate with the processor or processors controlling the primary and secondary transceivers. The central controller will have knowledge of when each primary transceiver is transmitting or receiving a radio signal, and on which radio channel. The central controller will use this information to direct the secondary transceivers to transmit signals whose purpose is to occupy the radio channel or channels being used by the primary transceivers, thus reducing the probability that nearby wireless networks will use the channels in use by the primary transceivers, at the same time as said primary transceivers.

Alternatively, the secondary transceivers could be directed to transmit signals on a regular basis, independent of whether the primary transceivers are transmitting or receiving data. This can encourage neighboring wireless networks to migrate to another frequency channel.

It is possible for the secondary transceivers to use either the same wireless standard as the primary transceivers (for example IEEE 802.11 in both cases). Alternatively, the secondary transceivers could use a combination of wireless standards. For example, some secondary transceivers could be compatible with the IEEE 802.11 standard, and other secondary transceivers in the same system could be compatible with the Long Term Evolution (LTE) standard, while all secondary transceivers operate in the same unlicensed radio frequency band.

Additional Examples

In some embodiments, the invention may be a processor implemented method for reducing interference in a radio frequency channel. This invention can comprise using one or more primary radio transceivers in a primary geographic region. In some embodiments, each primary radio transceiver may be controlled by at least one primary processor. In some embodiments, this primary processor can be used to select one or more radio frequency channels for transmission of data to devices, such as laptop computers, mobile phones, tablet computers, IOT devices.

In some embodiments, these devices may be computerized devices in their own right, and may be equipped with their third type of radio transceivers (device radio transceivers) and third type of processors (e.g. device processors). These devices are often located in this primary geographic region.

In some embodiments, the invention may further employ secondary transceivers. These secondary transceivers may further comprise secondary processors. In other embodiments, these secondary transceivers and the primary radio transceivers may both use the same processors, in which case the at least one primary processor and at least one secondary processor may be the same. In this case, this shared at least one processor will be called an at least one "common" processor.

In some embodiments, either manually, or via the aid of the at least one primary processor or common processor and electronic antenna steering methods (e.g. antenna directionality conveyed by phase array driven antenna methods, or actuator driven antenna mounts), the invention will direct the antennas of the one or more primary radio transceivers to provide communication services in the primary geographic region using these radio frequency channels. The invention can further use the one or more primary or common processors controlling the primary radio transceivers to assign to the primary radio transceivers these one or more radio frequency channels.

The invention can further use one or more secondary radio transceivers, often controlled by either a secondary processor or common processor, where each secondary radio transceiver is typically placed or located in a general vicinity of the one or more primary transceivers.

As previously discussed, each secondary radio transceiver is typically controlled by at least one processor, which may be either a local secondary processor, or a common processor. The invention will direct (either manually, or electronically using antenna steering methods, which may in some embodiments be secondary processor or common processor directed antenna steering methods) the antennas of the one or more said secondary radio transceivers, such that the radio signals of these secondary radio transceivers propagate, either partially, primarily or exclusively, towards geographic regions that are different from the previously discussed primary geographic region.

The invention will further use the one or more secondary or common processors controlling the secondary radio transceivers to assign to these secondary radio transceivers one or more radio frequency channels that overlap, either in whole or in part, with the one or more radio frequency channels that are assigned to the one or more primary radio transceivers. The invention will further use the one or more secondary or common processors controlling the secondary radio transceivers to direct the secondary radio transceivers to not accept wireless connections from devices for purposes of data communication.

In some embodiments, the invention may employ one or more primary radio transceivers and one or more secondary radio transceivers that are controlled by common processors comprising the same one or more processors. In other embodiments, as discussed above, the invention may employ one or more primary radio transceivers comprising primary processors, and one or more secondary radio transceivers comprising secondary processors. As an example of specific types of processors that may be suitable, such processors can comprise single or multiple core processors (alternatively termed microcontrollers) from the popular ARM, MIPS, PowerPC, x86 family, or other type processor family.

In some embodiments, the one or more secondary radio transceivers may transmit packets that indicate to wireless devices outside of the primary geographic region that the radio frequency channels are in use by another system.

In some embodiments, the one or more secondary radio transceivers may transmit packets (e.g. digital radio signals comprising a plurality of bits), such as system control packets, independent of whether or not the one or more primary radio transceivers have data packets to transmit or receive.

In other embodiments, the one or more secondary radio transceivers may transmit packets only if at least one of the one or more of the primary radio transceivers have data packets to transmit or receive.

In some embodiments, the one or more of secondary radio transceivers may each use more than one radio frequency channel at a same time.

While the above description of the present disclosure enables a person of ordinary skill to design a system that is considered under current state of the art to be the best mode thereof, those of ordinary skill will also understand that other embodiments may be possible. The present disclosure should therefore not be limited by the above described embodiment, method, and examples, rather by all embodiments and methods within the scope and spirit of the disclosure.

The invention claimed is:

1. A method for reducing radio frequency interference comprising:
   installing at least one primary radio transceiver in a primary geographic region;
   each primary radio transceiver controlled by at least one processor;
   selecting at least one radio frequency channel for transmission of data to devices equipped with radio transceivers that are located in said primary geographic region;
   directing at least one antenna of said at least one primary radio transceiver to provide communication services in said primary geographic region using said at least one radio frequency channel;
   using said at least one processor controlling said primary radio transceiver to assign to said at least one primary radio transceiver said at least one radio frequency channel;
   using at least one secondary radio transceiver, each said secondary radio transceiver placed in a general vicinity of said at least one primary radio transceiver;
   each secondary radio transceiver controlled by at least one processor;
   directing antennas of said at least one secondary radio transceiver, such that radio signals of said at least one secondary radio transceiver propagate primarily or exclusively towards geographic regions that are different from said primary geographic region;
   using said at least one processor controlling said at least one secondary radio transceiver to assign to said at least one secondary radio transceiver, at least one radio frequency channel that at least partially overlaps with said at least one radio frequency channel that is assigned to said at least one primary radio transceiver; and
   using said at least one processor controlling said at least one secondary radio transceiver to direct said at least one secondary radio transceiver to not establish wireless connections with any devices for purposes of data communication in said at least one radio frequency channel assigned to said at least one secondary radio transceiver, while continuing to transmit a signal in said at least one radio frequency channel assigned to said at least one secondary radio transceiver, whose radio signal is directed towards at least one geographic region that is different from said primary geographic region.

2. The method of claim 1, wherein one or more primary radio transceivers and one or more secondary radio transceivers are controlled by either:
   a) same processor comprising a common processor; or
   b) different at least one processor comprising at least one primary processor to control said at least one primary radio transceiver, and at least one secondary processor to control said at least one secondary radio transceiver.

3. The method of claim 1, wherein said at least one secondary radio transceiver transmits packets that indicate to wireless devices outside of said primary geographic region that said at least one radio frequency channel is in use by another system.

4. The method of claim 1, wherein said at least one secondary radio transceiver transmits packets independent of whether or not said at least one primary radio transceiver has data packets to transmit or receive.

5. The method of claim 1, wherein said at least one secondary radio transceiver transmits packets only if at least one of said primary radio transceivers have data packets to transmit or receive.

6. The method of claim 1, wherein said at least one secondary radio transceiver uses a plurality of radio frequency channels at a same time.

7. A wireless communication system comprising:
   at least one primary radio transceiver that provides wireless communication services to fixed and mobile devices in a primary geographic region;
   wherein each primary radio transceiver is controlled by at least one processor;
   and for each primary radio transceiver, at least one secondary radio transceiver, that is located in a general vicinity of said primary radio transceiver;
   wherein each secondary radio transceiver is controlled by at least one processor;
   wherein said at least one secondary radio transceivers is configured by said at least one processor controlling it to transmit signals in a same at least one radio frequency channel as said primary radio transceiver, and in coordination with said primary radio transceiver;
   wherein said at least one secondary radio transceiver is configured to direct its radio signals toward secondary geographic regions that are distinct from said primary geographic region; and
   wherein said at least one secondary radio transceiver is configured by said at least one processor controlling it to not establish wireless connections with neither fixed nor mobile devices for purposes of data communication in said at least one radio frequency channel assigned to said at least one secondary radio transceiver, while continuing to transmit a signal in said at least one radio frequency channel assigned to said at least one secondary radio transceiver, whose radio signal is directed towards at least one geographic region that is different from said primary geographic region.

8. The system of claim 7, wherein said at least one secondary radio transceiver is configured by said at least one processor controlling it such that radio signals transmitted by said at least one secondary radio transceiver serve to notify other wireless devices in said secondary geographic regions that said at least one radio frequency channel is already in use and cannot be used by other fixed and mobile devices in said secondary geographic regions.

9. The system of claim 7, wherein said at least one primary radio transceiver and said at least one secondary radio transceiver are configured to be compatible with a same wireless communication standard.

10. The system of claim 7, wherein said at least one primary radio transceiver is compatible with one wireless communication standard, while at least one of said secondary radio transceivers is compatible with a different wireless communication standard.

11. The system of claim 7, wherein said at least one secondary radio transceiver is configured by said at least one processor controlling it to transmit data at a same time as said at least one primary radio transceiver and on a same at least one radio frequency channel as said at least one primary radio transceiver.

12. The system of claim 7, wherein said at least one secondary radio transceiver is configured by said at least one processor controlling it to transmit on a same at least one radio frequency channel as said at least one primary radio transceiver, but during time periods when no signal is being transmitted by said at least one primary radio transceiver.

13. The system of claim 7, wherein said at least one secondary radio transceiver is configured by said at least one processor controlling it to transmit on a frequency or frequencies that are different from a frequency or frequencies of said at least one primary radio transceiver, and where frequency bands occupied by each secondary transceiver overlaps with a part of a frequency band occupied by said at least one primary radio transceiver.

14. The system of claim 7, wherein said at least one secondary radio transceiver is configured by said at least one processor controlling it to serve as a secondary radio transceiver for more than one primary radio transceiver.

15. The system of claim 7, wherein at least one of said secondary radio transceivers is configured by said at least one processor controlling it to use more than one radio frequency channel at a same time.

16. The system of claim 7, wherein said at least one secondary radio transceiver is configured by said at least one processor controlling it to perform channel measurements of at least one channel during periods in which said at least one secondary radio transceiver is not transmitting a signal.

17. A wireless communication system comprising:
a radio transceiver;
wherein said radio transceiver is controlled by at least one processor;
wherein said radio transceiver is connected to at least one primary antenna;
wherein said radio transceiver is configured by said at least one processor to provide wireless communication services to fixed and mobile devices in a primary geographic region using said at least one primary antenna;
wherein said radio transceiver is also connected to at least one secondary antenna;
wherein said at least one secondary antenna is configured to transmit radio signals primarily or exclusively towards secondary geographic regions that are different from said primary geographic region; and
wherein said radio transceiver is configured by said at least one processor to not establish wireless connections with neither fixed nor mobile devices via said at least one secondary antenna, while continuing to transmit a radio signal using said at least one secondary antenna, whose radio signal is directed towards at least one geographic region that is different from said primary geographic region.

18. The system of claim 17, wherein said radio transceiver is configured by said at least one processor controlling it such that radio signals transmitted by said at least one secondary antenna serve to notify fixed and mobile devices in said secondary geographic regions that at least one frequency channel is already in use and cannot be used by fixed and mobile devices in said secondary geographic regions.

19. The system of claim 17, wherein said transceiver is configured by said at least one processor controlling it to use more than one radio frequency channel at a same time with at least one of said secondary antennas.

20. The system of claim 17, wherein at least one of said secondary antennas is located outside of said primary geographic region.

* * * * *